United States Patent
Kellett, III

(10) Patent No.: US 6,619,390 B1
(45) Date of Patent: Sep. 16, 2003

(54) PARTICLE SEPARATOR FOR A FLUID PUMP INTAKE

(76) Inventor: Charles W. Kellett, III, 891 Old Hundred Rd., Pelzer, SC (US) 29669

( * ) Notice: Subject to any disclaimer, the term of this patent is extended or adjusted under 35 U.S.C. 154(b) by 0 days.

(21) Appl. No.: 10/092,652

(22) Filed: Mar. 7, 2002

(51) Int. Cl.⁷ .............................................. E21B 43/00
(52) U.S. Cl. .................... 166/105.1; 166/105.3
(58) Field of Search .................. 166/105.1, 105.2, 166/105.3, 105.4, 265

(56) References Cited

U.S. PATENT DOCUMENTS

| | | |
|---|---|---|
| 2,662,486 A | 12/1953 | Hillger |
| 3,289,608 A | 12/1966 | Laval, Jr. |
| 3,963,073 A | 6/1976 | Laval, Jr. ................. 166/105.1 |
| 4,148,735 A | 4/1979 | Laval, Jr. .................... 210/512 |
| 5,295,537 A | 3/1994 | Trainer ..................... 166/105.1 |
| 5,553,669 A * | 9/1996 | Trainer ..................... 166/105.1 |
| 5,653,286 A * | 8/1997 | McCoy et al. ........... 166/105.5 |
| 6,167,960 B1 | 1/2001 | Moya ........................ 166/105.1 |
| 6,280,502 B1 | 8/2001 | Van Veen ....................... 95/29 |

* cited by examiner

*Primary Examiner*—William Neuder
(74) *Attorney, Agent, or Firm*—Charles L. Schwab; Nexsen Pruet Jacobs & Pollard, LLC

(57) ABSTRACT

A particle separator for a fluid pump has a cylindrical body which is attachable to a pump by a flexible sleeve and has tangential slots directing intake fluid in swirling manner about an inlet tube within the cylindrical body. The inlet has an enlarged outer diameter at its lower end which causes the swirling inlet fluid to accelerate—thus aiding in particle separation.

5 Claims, 1 Drawing Sheet

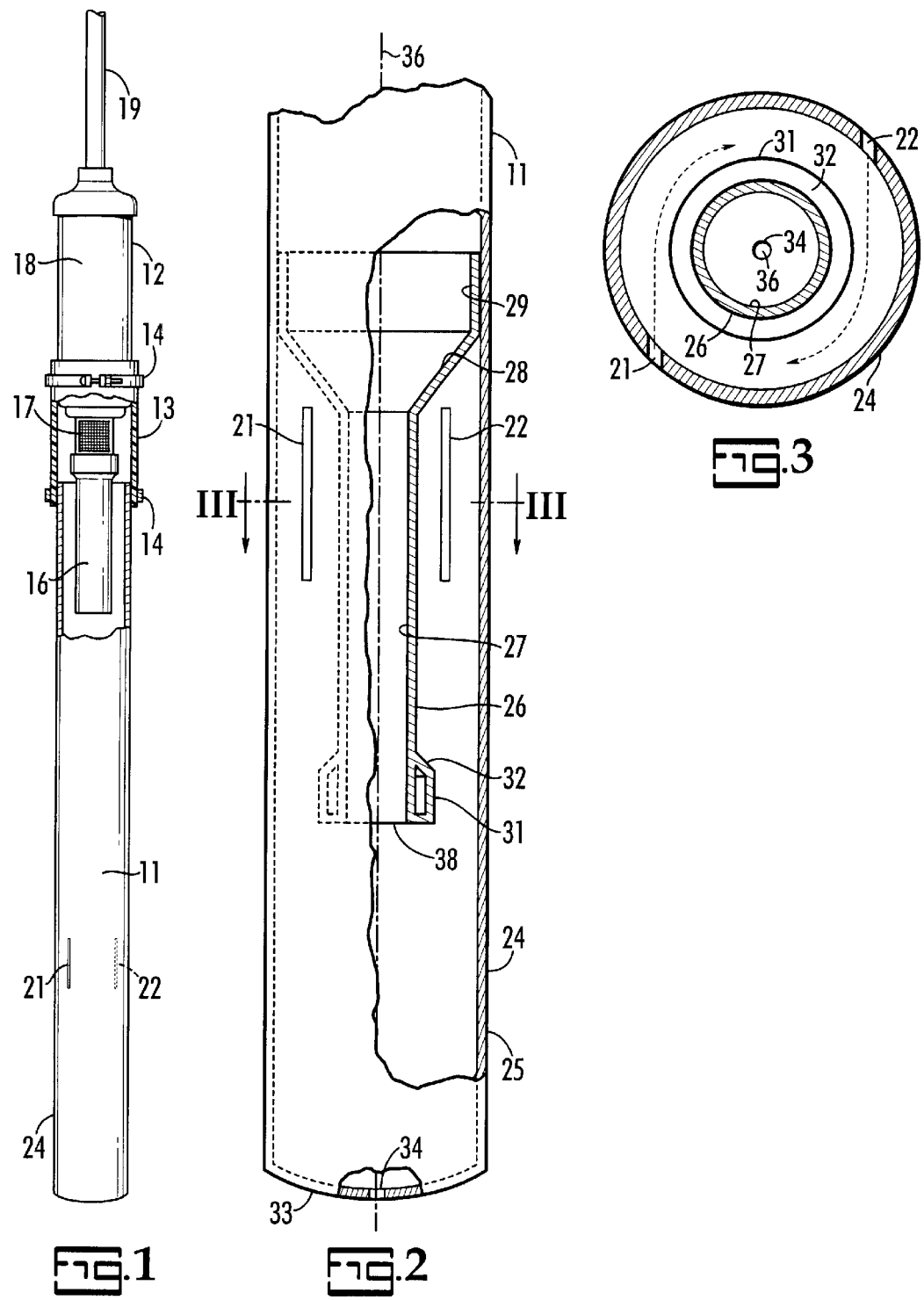

PARTICLE SEPARATOR FOR A FLUID PUMP INTAKE

TECHNICAL FIELD

This invention relates to a device for separating heavy particles from a fluid and particularly to a heavy particle separator at the intake of a submersible water pump.

BACKGROUND OF THE INVENTION

Screens and other filters have heretofore been provided for the intakes of fluid pumps, such as submersible water pumps and oil well pumps.

U.S. Pat. No. 5,295,537 issued Mar. 22, 1994 to C. W. Trainer for a Sand Separating, Producing-Well Accessory shows a sand separator for an oil well which includes a sand trap casing. The casing is removed from the well when there is a need to empty the sand from the sand trap casing.

U.S. Pat. No. 3,289,608 issued Dec. 6, 1966 to C. C. Laval, Jr. for a Separating Device discloses a devise for removing foreign particles from water entering a submersible water pump to avoid damage to the pump. In one separating device, a venturi connection is used to draw the removed particles into the pump outlet conduit. In another device a particle separating swirling action is imparted to intake water by tangentially formed slots in an intake chamber and water is removed from the chamber through a central outlet pipe. Accumulated particles may be removed from the flat bottom of the chamber through a central opening and an outlet pipe connected to a blow-off value.

U.S. Pat. No. 3,963,073 issued Jun. 15, 1976 to C. C. Laval, Jr. for a Purging Apparatus discloses a submersible pump having a particle separator which includes a lower storage section for the separated particles. A separate pump and conduit are provided to selectively flush the particles from the lower storage section.

U.S. Pat. No. 4,148,735 issued Apr. 10, 1979 to C. C. Laval, Jr. for a Separator for use in Boreholes of Limited Diameter discloses a particle separator for a submersible pump which includes an annular chamber with inlet slots extending in tangential relation to the axis of the chamber and a tailpipe for removing separated particles from the lower end of the chamber.

OBJECTS AND SUMMARY OF THE INVENTION

It is a primary object of this invention to provide a particle separator for a submersible pump which separates objectionable particles from well water in a highly efficient manner. It is a further object of this invention to provide a particle separator for a submersible pump which automatically discharges separated particles. Additionally it is an object of this invention to provide a particle separator with improved separation capabilities which is relatively inexpensive to manufacture and provides long trouble-free service. It is a further object of this invention to provide a particle separator which is attached to a submersible pump by a flexible coupling serving to isolate the particle separator from pump motor induced vibration.

The particle separator of this invention has an elongated cylindrical body connected to the submersible pump by a flexible sleeve. The lower part of the cylindrical body includes a plurality of parallel axially extending slots which are tangential to the axis of the cylindrical body. Water entering the body through the slots swirl downwardly in a vortex fashion about a centrally mounted inlet tube and enters the lower end of the inlet tube. The lower end of the inlet tube is lower than the slots and includes a flared exterior diameter portion which serves to accelerate the swirling action of the intake water. The bottom of the cylindrical body slopes to a central opening through which separated particles are discharged when the pump stops running. Upon pump shut down, the momentum of the swirling water in the chamber urges the separated particles to the discharge opening.

BRIEF DESCRIPTION OF THE DRAWINGS

An embodiment of the invention is illustrated in the accompanying drawings, in which:

FIG. 1 is side view of a submersible pump to which a particle separator is attached with in some parts being broken away for illustration purposes;

FIG. 2 is an enlarged view of the lower end of the particle separator shown in FIG. 1 with parts broken away for illustration purposes, and FIG. 3 is a section taken on line III—III in FIG. 2.

DETAILED DESCRIPTION OF THE INVENTION

Referring to FIG. 1, a particle separator 11 has the upper end of its cylindrical body 24 connected to a submersible pump unit 12 by a flexible sleeve 13 of suitable plastic composition. The flexible sleeve 13 is secured by a pair of tightening bands 14. The flexible sleeve 13 advantageously isolates the particle separator 11 from the vibrations produced by the pump motor 16. The pump unit 13 includes an electric motor 16, a sand screen 17 and a pump 18 to which an outlet pipe 19 is connected. Water is drawn into the particle separator I through a pair of circumferentially spaced and axially extending slots 21, 22 in its cylindrical body 24.

Referring also to FIGS. 2 and 3, an inlet tube 26 with a central interior channel 27 of uniform diameter is positioned within and in concentric relation to the elongated cylindrical body 24. At about the upper end of the slots 21, 22 the inlet tube 26 has a conically shaped portion 28 joined at its upper end by an enlarged diameter band 29 secured to the body 24 as by welding or other suitable means. The lower end of the inlet tube 26 is given a flared out bell shaped exterior by an annular ring 31 having flared part 32 extending upwardly and radially inwardly to the exterior of the inlet tube 26. The cylindrical body 24 includes a bottom 33, which slopes downwardly from the cylindrical wall 25 of the body 24 to a central vertical particle discharge opening 34 at the axis 36 of the body 24.

As seen on reference to FIG. 3, the narrow slots 21, 22 are formed tangentially to a circle centered on the axis 36. The slots 21, 22 in the body 24 are circumferentially spaced from one another in diametrically opposite positions. The slots 21, 22 direct incoming water in a swirling motion which serves to separate sand and other heavy particles by throwing them against the inside wall of the body 24. As the swirling intake water is drawn downwardly to the intake opening 38 of the inlet tube 26, the swirling water is further accelerated as it passes through the restriction formed by the flared annular ring 31. The heavy particles fall to the bottom 33 of the body 24.

The bottom opening 34 is larger in diameter than the width of the slots 21, 22 that is, the left to right dimension of the slots 21, 22 as viewed in FIG. 3. Thus any granular particle passing through the slots 21, 22 will be sufficiently small to permit it to pass out of the discharge opening 34. When the pump unit 12 is shut down, the swirling action of the water in the lower end of the body 24 will sweep the separated particles to the discharge opening 34 and the particles will thus be automatically discharged from the body 24. This avoids the need to pull the pump unit 12 to empty the particle separator and avoids the expense of additional particle purging apparatus as heretofore suggested by others

PRACTICAL APPLICATION

The particle separator of this invention does more than remove sand from drinking water. It capable of removing other heavy molecule particles. For instance in an area where excess uranium has been detected in drinking water, the particle separator of this invention removed a high percentage of the harmful particles—rendering the pumped water safe for human consumption. The particle separator is also capable of removing other harmful particles such as those containing arsenic, radium and copper.

What is claimed is:

1. A particle separator for a fluid pump intake comprising:
   an elongated cylindrical body including
      a cylindrical wall with an open upper end adapted for connection to the intake end of said fluid pump,
      a bottom secured to the lower end of said cylinder wall including a centrally located particle discharge opening at the axis of said cylindrical wall, said bottom sloping downwardly toward said discharge opening,
      a pair of narrow axially extending slots of uniform width formed in diametrically opposite sides of a lower part of said cylindrical wall, said slots extending tangential to a circle centered on said axis and
      an inlet tube having a central interior channel of uniform cross section, a radially outward flared upper end rigidly secured to said cylindrical wall and a radially outward flared lower end,
   said slots directing intake fluid in a swirling path around said inlet tube and said flared lower end of said inlet tube serving to narrow the passage of said intake fluid causing it to accelerate thereby enhancing the particle separating capability of said particle separator.

2. The particle separator set forth in claim 1 wherein said discharge opening is an annular opening whose diameter is greater than the width of said slots.

3. The particle separator as set forth in claim 1 and further comprising a flexible sleeve connecting said upper end of said cylindrical tube to said pump.

4. The particle separator as set forth in claim 1 wherein the upper end of said slots are at substantially the same elevation as the of said central internal channel and said flared end of said inlet tube.

5. The particle separator as set forth in claim 1 wherein the lower end of said inlet tube is position below the lower ends of said slots by a distance greater than the length of said slots in the direction of said axis.

\* \* \* \* \*